United States Patent [19]  
Maher

[11] Patent Number: 4,769,081  
[45] Date of Patent: Sep. 6, 1988

[54] READILY DISPERSIBLE STARCH COMPOSITIONS

[75] Inventor: Stephen L. Maher, Decatur, Ill.

[73] Assignee: A. E. Staley Manufacturing Division of Staley Continental, Inc., Decatur, Ill.

[21] Appl. No.: 98,251

[22] Filed: Sep. 18, 1987

[51] Int. Cl.$^4$ .............................................. C08B 30/12
[52] U.S. Cl. ....................................... 127/33; 127/32; 536/102; 426/661
[58] Field of Search ..................... 127/32, 33; 536/102; 426/661

[56] References Cited

U.S. PATENT DOCUMENTS 4,309,535  1/1982  Majewicz .............................. 536/85
4,575,395  3/1986  Rudin .................................... 127/32

FOREIGN PATENT DOCUMENTS 863203  2/1971  Canada .................................. 127/70

OTHER PUBLICATIONS

Japanese article entitled "Treatment of Starch with Surface-Active Agents", by Koji Maruyama, Dempunto Gijutsu Kenkyo Kaiho 24, 1–4 (1962).
Abstract EP Patent 202-434-A dated 11/26/86.
Physical and Functional Properties of Some Higher Alkyl Polyglucosides by Hughes and Lew, Journal of the American Oil Chemists Society, vol. 47, May 1970, pp. 162–167.

Primary Examiner—Helen M. S. Sneed  
Assistant Examiner—Chung K. Pak  
Attorney, Agent, or Firm—James B. Guffey; Michael F. Campbell; J. Daniel Wood

[57] ABSTRACT

The rate and ease of water dispersibility and/or water solubility of powdered or granular starch materials are substantially enhanced by the incorporation therein of a small but effective amount of a glycoside surfactant ingredient.

10 Claims, No Drawings 4,769,081

READILY DISPERSIBLE STARCH COMPOSITIONS

BACKGROUND OF THE INVENTION

The present invention pertains generally to cold water dispersible and/or cold water soluble starch compositions and, in particular, to cold water dispersible or cold water soluble starch compositions which contain a glycoside surfactant in an amount sufficient to impart enhanced dispersibility or solubilization characteristics to the resulting starch composition.

Starch materials are, of course, well known and readily available and find wide use in a variety of food and industrial applications. As is also known, such starch materials can exist and be marketed and used in a variety of forms including, for example, in non-gelatinized, cold water insoluble granular form, in cold water soluble, non-gelatinized granular form and in gelatinized (or "pregelatinized"), non-granular cold water soluble form.

In many of its food and industrial applications, starch usage entails at some point in the overall process a step in which the starch material is dispersed and/or dissolved in an aqueous medium such as water, milk, etc. In the case of non-gelatinized, cold water insoluble granular starches (commonly called "cook-up" starches) such material typically is initially dispersed or slurried in a cold aqueous medium and the resulting aqueous mixture (i.e., slurry or dispersion) is heated (or cooked) to gelatinize and solubilize the granular starch material. In the case of cold water soluble granular or pregelatinized (i.e., non-granular) starch materials, cooking is not necessary for solubilization and aqueous solutions of these starch materials can be formed by simply admixing the starch with cold water.

A problem which can commonly occur, particularly in the absence of fairly intense mixing or agitation, upon initial contact of the various starch materials with the aqueous medium is the formation of difficult-to-dissolve (or disperse) lumps or agglomerated gels of the starch material. This problem is particularly pronounced in the case of readily cold water soluble pregelatinized starch materials and, according to U.S. Pat. No. 4,575,395 (issued Mar. 11, 1986 to Richard E. Rudin), can be mitigated by coating the pregelatinized starch material with from about 0.05 to about 20 weight percent of a food grade emulsifier. Food grade emulsifiers suggested for use in accordance with the Rudin patent are those selected from the group consisting of propylene glycol monoesters, distilled monoglycerides and sodium stearyl lactylate hydrophillic ethoxylated sorbitan monoesters, dextrose, maltodextrin, lecithin, sucrose monoglycerides, diglycerides and mixtures thereof.

SUMMARY OF THE INVENTION

It has now been discovered that glycoside surfactants are especially effective in preventing the agglomeration or lumping of dry powdery or granular starch materials upon their initial contact with an aqueous medium and in dramatically enhancing the rate of dispersion or dissolution of said starch materials. Accordingly, the present invention, in one of its aspects, is a starch composition which comprises, on a total starch composition dry weight basis, from about 80 to about 99.999 weight percent of a starch ingredient and from about 0.001 to about 20 weight percent of a glycoside surfactant ingredient.

In another aspect, the present invention is a method of enhancing the dispersibility and/or dissolution characteristics of a substantially dry, powdered or granular starch material by treating (e.g., admixing and/or coating) said starch material; with a small but effective amount of a glycoside surfactant ingredient.

A particularly noteworthy feature or aspect of the present invention resides in the efficiency and effectiveness of the glycoside surfactant in preventing lumping and agglomeration of the subject starch material upon its initial contact with a continuous aqueous medium and in thereby facilitating the rapid dispersion and/or dissolution of said starch material even in the absence of intense mixing or agitation. More specifically, it has been found in this regard that the foregoing benefits are obtained in accordance with the present invention even at extremely low glycoside surfactant usage levels (i.e., at glycoside surfactant usage levels of less than 0.1 weight percent, and even at levels of less than 0.05 weight percent, on a starch material dry solids weight basis).

DETAILED DESCRIPTION OF THE INVENTION

Starch materials suitable for use herein can be derived from a wide variety of plant sources such as, for example, corn, potato, wheat, rice, waxy maize, tapioca, etc. Such starches can be unmodified or can be chemically modified or derivatized via the various known methods of derivatization including, for example, esterification, etherification, oxidation, and the like.

The present invention is generally applicable to starch materials in non-gelatinized cold water insoluble granular form, in cold water soluble non-gelatinized granular form and in gelatinized (or "pregelatinized") non-granular cold water soluble form. It is to be noted, however, that the benefits of such invention are particularly pronounced and noteworthy in those cases wherein the starch material employed is of a cold water soluble variety (i.e., either in ungelatinized, granular cold water soluble form or in pregelatinized cold water soluble form).

As used herein, the terms "ungelatinized" or "non-gelatinzed" connote starch which has not been subjected to granule fragmenting process conditions and which therefore consists essentially of whole unfragmented granules.

The term "cold water soluble" as used herein connotes starch materials which are at least about 90% (by weight) soluble in 25° C. water.

Starch materials of particular interest for use herein include the various cold water soluble pregelatinized starches, particularly pregelatinized potato starch and especially pregelatinized cationic potato starches.

The above-described starch materials constitute the predominant ingredient within the compositions of the present invention. Typically, said starch material will constitute, on a dry (i.e., exclusive of normally present starch ingredient moisture content which typically ranges from about 5 to about 20 weight percent on a moist starch total weight basis) solids weight basis, from about 80 to about 99.999 (preferably from about 95 to about 99.999, more preferably from about 98 to about 99.995 and most preferably from about 99.5 to about 99.995) weight percent of the combined weight of the starch and glycoside surfactant ingredients.

Glycoside surfactant ingredients suitable for use herein include those of the formula:

$$RO(R'O)_y(Z)_x \qquad I$$

wherein R is a monovalent organic radical (e.g., a monovalent saturated aliphatic, unsaturated aliphatic or aromatic radical such as alkyl, hydroxyalkyl, alkenyl, hydroxyalkenyl, aryl, alkylaryl, hydroxyalkylaryl, arylalkyl, alkenylaryl, arylalkenyl, etc.) containing from about 6 to about 30 carbon atoms (preferably from about 8 to about 18 carbon atoms, more preferably from about 8 to about 16 carbon atoms and most preferably from about 8 to about 14 carbon atoms); R' is a divalent hydrocarbon radical containing from 2 to about 4 carbon atoms; y is a number having an average value of from 0 to about 12 (preferably from 0 to about 5 and most preferably 0); Z represents a moiety derived from a reducing saccharide containing 5 or 6 carbon atoms (most preferably arabinose, xylose, glucose, galactose and combinations thereof); and x is a number having an average value of from 1 to about 6 (preferably from 1 to about 3 and most preferably from 1 to about 2).

Glycoside surfactants suitable for use herein also include those of the formula I above in which one or more of the normally free (i.e., unreacted) hydroxyl groups of the saccharide moiety, Z, have been derivatized, for example, sulfated, phosphated, borated, etc. or alkoxylated (preferably, ethoxylated or propoxylated) so as to attach one or more pendant alkoxy or poly (alkoxy) groups in place thereof. In the latter instance, the amount of alkylene oxide (e.g., ethylene oxide, propylene oxide, etc.) employed will generally correspond to an average of from about 1 to about 20 (preferably from about 1 to about 10, more preferably from about 1 to about 5 and most preferably from about 2 to about 5) moles thereof per mole of saccharide moiety.

As a general proposition, the glycoside surfactants can be employed in the practice of the present invention in amounts ranging from about 0.001 to about 20 percent of the total dry weight of the resulting treated starch composition. Preferably, however, said glycoside surfactant is employed in an amount corresponding to from about 0.001 to about 5 (more preferably from about 0.005 to about 2 and especially from about 0.005 to about 0.5) weight percent on a total starch composition dry weight basis. Moreover, in certain especially preferred embodiments hereof advantage is taken of the unusual efficiency and effectiveness of the indicated glycoside surfactants for the present purposes by limiting the usage thereof to extremely low levels of addition, specifically in the range of from about 0.001 to about 0.1 (more preferably from about 0.001 to about 0.05) weight percent on a total starch composition dry weight basis.

The particular methodology employed for preparing the subject starch compositions is not especially critical so long as the specific method chosen results in the glycoside surfactant ingredient being intimately admixed with and/or coated onto the individual starch particles. As a practical matter, however, it is generally preferred to dry mix or dry blend the starch ingredient (in substantially dry, particulate form and, as has been noted above, in predominant proportion with an aqueous solution of the glycoside surfactant ingredient.

The term "substantially dry" as used hereinabove is intended to connote that the particulate (e.g., native granular; defatted granular; spray dried or drum dried, pregelatinized powder; etc.) starch ingredient either can be "bone dry" (i.e., having essentially no water or moisture content) or can, and more typically will, have a moisture content corresponding to that usually associated with that particular type of particulate starch material (e.g., at levels ranging from about 5 to about 20 weight percent).

In practicing the aforementioned, preferred treatment method, the aqueous glycoside surfactant solution preferably is added to and admixed with a substantially dry mass of the particulate starch material in a fashion and in an amount such that the starch material does not become solubilized or dispersed in the aqueous glycoside solution. In accordance with this method, the aqueous glycoside surfactant solution is adsorbed into and/or on the individual particles while said starch particles themselves remain in discrete, solid particulate form. In practicing this particular method, any conventional dry mixing or dry blending apparatus can be suitably employed (e.g., ribbon blenders, dough mixers, twin shell blenders, sigma blade mixers or any other type of intensive dry mixer) and it will generally be preferred to use relatively concentrated aqueous glycoside surfactant solutions (e.g., containing from about 30 to about 70, preferably from about 40 to about 60 and more preferably from about 45 to about 55, weight percent of the glycoside surfactant on a total solution weight basis) in order to avoid solubilization and/or agglomeration of the starch material during the mixing process.

If desired, a minor proportion (e.g., from 0.5 to about 20, preferably from about 1 to about 5 or 10, weight percent on a total solution weight basis) of a lower alkanol such as methanol, ethanol, propanol, etc. can be included within the aqueous glycoside surfactant solutions in order to reduce the viscosity thereof. This can be particularly desirable and beneficial in those cases where solutions having relatively higher glycoside surfactant concentrations are employed since these latter solutions can otherwise have relatively high solution viscosities.

With regard to alternative, but less preferred treatment methods, it can also be mentioned that some glycoside surfactant materials can take the form of molten liquids at relatively low temperatures such as, for example in the range of from about 20° to about 100° C. Accordingly, such liquid glycoside surfactants can, if desired, be dry blended with the particulate starch ingredient in "neat" or molten liquid form instead of utilizing and applying same in the form of an aqueous solution thereof.

As another lesser preferred alternative, the treated starch compositions hereof can also be prepared by dissolving or dispersing the starch starting material of interest in a relatively large or excess quantity or proportion of an aqueous glycoside surfactant solution and thereafter recovering the resulting glycoside surfactant-containing starch product from the excess surfactant solution e.g., via centrifugation or filtration in the case of water-insoluble treated starch products or via spray drying, drum drying, etc. in the case of water-soluble treated starch products). In practicing this latter treatment method, relatively dilute aqueous glycoside surfactant solutions (e.g., containing from about 0.005 to about 20 or 25, preferably from about 0.01 to about 5, 10 or 15, weight percent of the glycoside surfactant on a total solutions weight basis) can be suitably employed. However, since this latter method entails an extra solid/liquid separation step and/or a separate drying operation, it is generally less preferred than the above-described dry blending method using relatively concentrated aqueous glycoside surfactant solutions.

The glycoside surfactant-containing starch compositions hereof are ultimately recovered in substantially dry, solid particulate form and are suitable for use in any of the various industrial end-use applications to which the corresponding starch starting material is conventionally applicable. Thus, for example, the subject starch compositions can be suitably employed in paper sizing applications, as a wet end dry strength additive, in pigmented paper coating compositions, in packaging adhesive applications, in size press applications, in binder compositions, in textile sizing and finishing applications and the like. Unlike their untreated prior art counterparts, however, the subject starch compositions are substantially more readily and rapidly dissolved or dispersed in water or other aqueous medium (i.e., without lumping or agglomeration upon initial water contact even in the intense mixing or agitation).

The present invention is further understood and illustrated by reference to the following example thereof.

EXAMPLE 1

In this example, 50 parts by weight of a pregelatinized cationic potato starch is dry blended (at a temperature of about 25° C. and for a time period of about 5 minutes) with 0.005 parts by weight of an aqueous solution (containing 50 weight percent surfactant on a total solution weight basis) of a $C_{12-13}$ alkyl glucoside surfactant having an average degree of polymerization (D.P.) of about 1.8.

The resulting treated starch composition contains about 0.005 weight percent of the $C_{12-13}$ alkyl glucoside surfactant on a total dry solids weight basis and readily dispersed in cold water without lumping or agglomeration and without stirring when 3 parts by weight thereof is dumped into a vessel containing 100 parts by weight of cold water.

While the subject matter hereof has been described and illustrated by reference to specific embodiments and examples thereof, such is not to be interpreted as in any way limiting the scope of the instantly claimed invention.

What is claimed is:

1. A substantially dry, particulate starch composition which comprises, on a total starch composition dry weight basis, from about 80 to about 99.999 weight percent of a starch ingredient and from about 0.001 to about 20 weight precent of a glycoside surfactant ingredient of the formula:

$$RO(R'O)_y(Z)_x$$

wherein R is a monovalent organic radical containing from about 6 to about 30 carbon atoms, R' is a divalent hydrocarbon radical containing from 2 to about 4 carbon atoms; y represents a value of from 0 to about 12; Z represents a saccharide moiety having 5 or 6 carbon atoms; and x represents a value from 1 to about 6.

2. The composition of claim 1 wherein the starch ingredient is a cold water soluble granular or pregelatinized starch material.

3. The composition of claim 2 wherein the starch ingredient is a pregelatinized starch material.

4. The composition of claim 3 wherein the pregelatinized starch material is potato starch.

5. The composition of claim 4 wherein the potato starch is cationic.

6. The composition of claim 1 wherein R is a monovalent organic radical containing from about 8 to 18 carbon atoms; y is zero; said saccharide is derived from arabinose, xylose, glucose or galactose; and x represents a value of from 1 to about 3.

7. The composition of claim 6 wherein the saccharide moiety is derived from glucose.

8. The composition of claim 7 wherein x represents a value of from 1 to about 2 and R is a monovalent organic radical containing from about 8 to about 16 carbon atoms.

9. The composition of claim 1 wherein the glycoside surfactant ingredient constitutes from about 0.001 to about 5 weight percent of said composition on a dry weight basis.

10. The composition of claim 1 wherein the glycoside surfactant ingredient from about 0.005 to about 0.5 weight percent of said composition on a dry weight basis.

* * * * *